US011901116B2

(12) United States Patent
Moriyama et al.

(10) Patent No.: US 11,901,116 B2
(45) Date of Patent: Feb. 13, 2024

(54) INTERNAL-COMBUSTION-ENGINE IGNITION COIL APPARATUS

(71) Applicant: Mitsubishi Electric Corporation, Tokyo (JP)

(72) Inventors: Kenta Moriyama, Tokyo (JP); Nobuyuki Sawazaki, Tokyo (JP); Mitsuharu Hashiba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 775 days.

(21) Appl. No.: 16/969,033

(22) PCT Filed: May 14, 2018

(86) PCT No.: PCT/JP2018/018486
§ 371 (c)(1),
(2) Date: Aug. 11, 2020

(87) PCT Pub. No.: WO2019/220483
PCT Pub. Date: Nov. 21, 2019

(65) Prior Publication Data
US 2021/0035732 A1 Feb. 4, 2021

(51) Int. Cl.
*H01F 38/12* (2006.01)
*F02P 3/02* (2006.01)
(Continued)

(52) U.S. Cl.
CPC ................ *H01F 38/12* (2013.01); *F02P 3/02* (2013.01); *H01F 27/022* (2013.01); *H01F 27/08* (2013.01);
(Continued)

(58) Field of Classification Search
CPC ........ H01F 38/12; H01F 27/022; H01F 27/08; H01F 27/24; H01F 27/28; H01F 27/40;
(Continued)

(56) References Cited

U.S. PATENT DOCUMENTS 4,899,256 A * 2/1990 Sway-Tin ................. F02P 3/02 361/752
4,951,641 A * 8/1990 Takaishi .................. H01F 38/12 123/634
(Continued)

FOREIGN PATENT DOCUMENTS

JP 63-217648 A 9/1988
JP 04-125431 U 11/1992
(Continued)

OTHER PUBLICATIONS

International Search Report for PCT/JP2018/018486 dated Jun. 26, 2018 [PCT/ISA/210].
(Continued)

*Primary Examiner* — Mang Tin Bik Lian
(74) *Attorney, Agent, or Firm* — Sughrue Mion, PLLC; Richard C. Turner

(57) ABSTRACT

There is provided an internal-combustion-engine ignition coil apparatus in which an igniter in a connector assembly is contained in the case of the ignition coil apparatus, in which an adhesive bonds the igniter to a heat sink inserted into the case through an opening window of the case and an adhesive bonds the heat sink to the inner circumferential surface of the opening window, and in which the exposed portion of the heat sink is exposed to the outside of the case through the opening window.

20 Claims, 3 Drawing Sheets

(51) Int. Cl.

| | |
|---|---|
| ***H01F 27/02*** | (2006.01) |
| ***H01F 27/08*** | (2006.01) |
| ***H01F 27/24*** | (2006.01) |
| ***H01F 27/28*** | (2006.01) |
| ***H01F 27/40*** | (2006.01) |

(52) U.S. Cl.
CPC ............. *H01F 27/24* (2013.01); *H01F 27/28* (2013.01); *H01F 27/40* (2013.01)

(58) Field of Classification Search
CPC ........ H01F 27/025; H01F 27/02; H01F 27/22; F02P 3/02; F01P 1/06
See application file for complete search history.

(56) References Cited

U.S. PATENT DOCUMENTS

| | | | | | |
|---|---|---|---|---|---|
| 5,191,872 | A * | 3/1993 | Takaishi | H01F 38/12 | 123/634 |
| 5,271,373 | A * | 12/1993 | Takaishi | F02P 3/02 | 336/107 |
| 5,558,074 | A | 9/1996 | Fukatsu et al. | | |
| 6,107,790 | A * | 8/2000 | Sawazaki | H01F 38/12 | 123/634 |
| 2003/0222743 | A1* | 12/2003 | Kondo | H01F 27/022 | 336/90 |
| 2012/0227715 | A1* | 9/2012 | Kawai | F02P 3/02 | 123/634 |
| 2018/0315537 | A1* | 11/2018 | Takahashi | H01F 17/04 | |

FOREIGN PATENT DOCUMENTS

| | | | |
|---|---|---|---|
| JP | 05-087034 | A | 4/1993 |
| JP | 05-321807 | A | 12/1993 |
| JP | 08-042438 | A | 2/1996 |
| JP | 08-144919 | A | 6/1996 |
| JP | 2003-234437 | A | 8/2003 |
| JP | 2008-51032 | A | 3/2008 |

OTHER PUBLICATIONS

Written Opinion for PCT/JP2018/018486 dated Jun. 26, 2018 [PCT/ISA/237].

Office Action dated May 11, 2021 in Japanese Application No. 2020-519215.

Communication dated Sep. 28, 2021 from the China National Intellectual Property Administration in Chinese Application No. 201880093098.6.

* cited by examiner

INTERNAL-COMBUSTION-ENGINE IGNITION COIL APPARATUS

CROSS REFERENCE TO RELATED APPLICATIONS

This application is a National Stage of International Application No. PCT/JP2018/018486 filed May 14, 2018.

TECHNICAL FIELD

The present disclosure relates to an internal-combustion-engine ignition coil apparatus that supplies an ignition plug mounted in an internal combustion engine with a voltage for producing a spark discharge.

BACKGROUND ART

In recent years, because in order to raise the gasoline mileage of an internal combustion engine, leaning of an air-fuel ratio or adoption of the EGR (Exhaust Gas Recirculation) system has been advancing, it is difficult to combust a fuel-air mixture in an internal-combustion-engine cylinder. Accordingly, it is required to enlarge the current or the output of an ignition coil apparatus. However, because various auxiliary apparatuses are mounted in the vicinity of an internal-combustion-engine ignition coil apparatus, the mounting space of the ignition coil apparatus in the internal combustion engine is restricted. In consideration of these situations, it is required that in an ignition coil apparatus, there are taken countermeasures against heat generation caused by the current enlargement or the output enlargement and countermeasures for suppressing upsizing thereof as much as possible.

A conventional internal-combustion-engine ignition coil apparatus disclosed in Patent Document 1 is configured in the following manner: an ignition coil winding portion and an igniter are contained in a case; the igniter is disposed at the opening-face side of the case; a heat sink is bonded to the igniter with an adhesive or the like; furthermore, a potting resin is injected into and cured in the case in such a way that the heat sink is exposed from the potting resin. In this conventional ignition coil, the heat sink integrated with the igniter radiates heat generated in the igniter to the air; therefore, it is made possible that without deteriorating the heat radiation performance, the ignition coil winding portion and the igniter are compactly contained in one and the same case; thus, the mountability thereof in the internal combustion engine is raised.

In addition, there exists another conventional ignition coil apparatus configured in such a way that in order to secure the heat radiation performance, a heat sink is bonded, with an adhesive or the like, to a connector assembly in which a connector and an igniter are integrated.

PRIOR ART REFERENCE

Patent Document

[Patent Document 1] Japanese Patent Application Laid-Open No. H5-87034

DISCLOSURE OF THE INVENTION

Problems to be Solved by the Invention

In the conventional ignition coil apparatus disclosed in Patent Document 1, an igniter is disposed at the opening-face side of a case and a heat sink is integrated with the igniter; therefore, the position where the igniter is disposed is limited and hence the inner layout of the ignition coil apparatus is largely restricted. Moreover, among respective ignition coil apparatuses, there occurs a variation in the amount of a potting resin to be filled into the case; thus, among the respective ignition coil apparatuses, the area of the heat sink to be exposed differs and hence a variation occurs in the heat radiation performance. Furthermore, it is difficult to extract a superfluous potting resin existing around the igniter and the heat sink; thus, the ignition coil apparatus becomes large. Moreover, because a large amount of the potting resin exists around the igniter, a thermal stress that is exerted on the igniter by the potting resin becomes large and hence the reliability of the igniter itself is deteriorated.

Furthermore, in the case of the foregoing conventional ignition coil apparatus in which the heat sink is bonded to the connector assembly, the fitting portion between the connector assembly and the case becomes large; thus, the probability that a potting resin leaks out to the outside of the case becomes high. Therefore, in order to prevent the leakage of the potting resin, it is required to accurately mold the fitting portion between the connector assembly and the case or a process of coating the periphery of the foregoing fitting portion with an adhesive is newly required.

The present disclosure has been implemented in order to solve the foregoing problems in conventional ignition coil apparatuses; the objective thereof is to obtain an internal-combustion-engine ignition coil apparatus having excellent heat radiation performance and quality, without deteriorating the layout easiness of the ignition coil apparatus.

Means for Solving the Problems

An internal-combustion-engine ignition coil apparatus disclosed in the present disclosure supplies an ignition plug mounted in an internal combustion engine with a voltage for producing a spark discharge. The internal-combustion-engine ignition coil apparatus includes a primary coil, a secondary coil disposed in such a way as to surround an outer circumferential portion of the primary coil, an iron core that makes the primary coil and the secondary coil magnetically couple with each other, a case that contains the primary coil, the secondary coil, and the iron core, a connector assembly in which a connector that is connected with an external power source and an igniter that is electrically connected with the connector and energizes or de-energizes the primary coil are integrally fixed to each other, and a heat sink for cooling the mold module.

The internal-combustion-engine ignition coil apparatus is characterized in that the connector assembly is assembled to the case, in that the igniter is contained in the case, in that the case has an opening window that opens in a wall face portion thereof facing a surface portion of the igniter, in that the heat sink is inserted into the case through the opening window so as to be bonded not only to the surface portion of the igniter with a first adhesive but also to the inner circumferential surface of the opening window with a second adhesive, and the heat sink has an exposed portion that is exposed to the outside of the case through the opening window, and in that a potting resin is filled into the case.

Advantage of the Invention

The present disclosure makes it possible to obtain an internal-combustion-engine ignition coil apparatus having excellent heat radiation performance and quality, without deteriorating the layout easiness of the ignition coil apparatus.

BEST MODE FOR CARRYING OUT THE INVENTION

Figure 1:
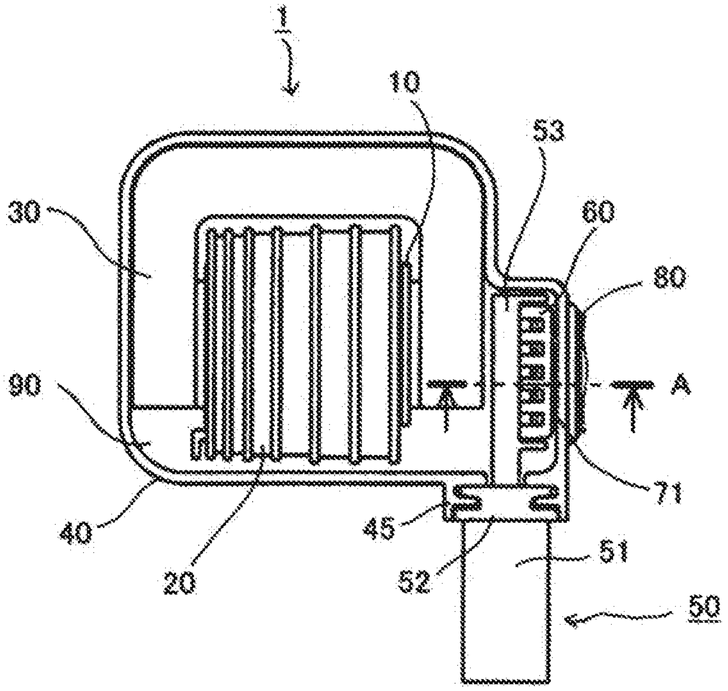
FIG. 1 is a plan view of an internal-combustion-engine ignition coil apparatus according to Embodiment 1.

Hereinafter, an internal-combustion-engine ignition coil apparatus according to Embodiment 1 will be explained in detail with reference to the drawings. In each of the drawings, the same reference characters denote the same or similar portions.

Embodiment 1

Figure 2:
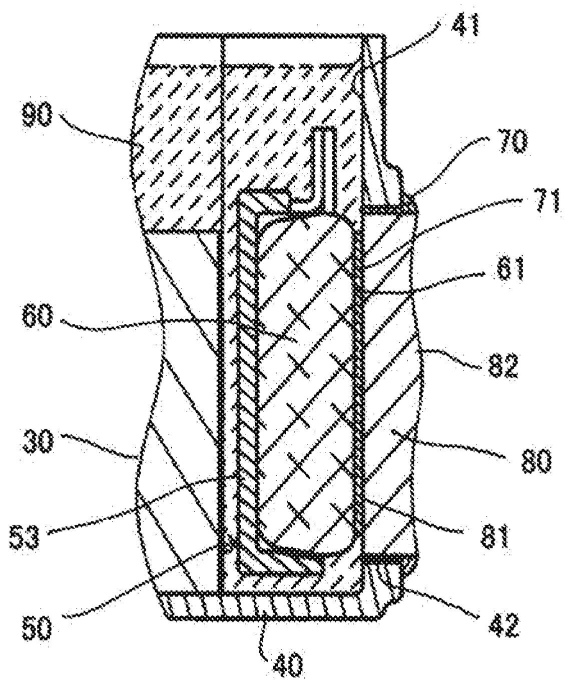
FIG. 2 is a partial cross-sectional view of the internal-combustion-engine ignition coil apparatus according to Embodiment 1.

FIG. 1 is a plan view of an internal-combustion-engine ignition coil apparatus according to Embodiment 1; FIG. 2 is a partial cross-sectional view of the internal-combustion-engine ignition coil apparatus according to Embodiment 1 and illustrates the cross section thereof along the broken line A in FIG. 1, when viewed in the direction indicated by the arrow marks. In FIGS. 1 and 2, an ignition coil apparatus 1 is provided with a primary coil 10 formed in the shape of a tube, a secondary coil 20 disposed coaxial with the primary coil 10, an iron core 30 that makes the primary coil 10 and the secondary coil 20 magnetically couple with each other, a connector assembly 50, a case 40, and a heat sink 80. Inside thereof, the case 40 contains the primary coil 10, the secondary coil 20, the iron core 30, and an igniter 60 and a connector housing 53, which are parts of the connector assembly 50.

The secondary coil 20 is formed in the shape of a cylindrical tube having a hollow portion and is disposed in such a way as to contain the primary coil 10 in the hollow portion. The iron core 30 is formed in the shape of a ring; part of the iron core 30 penetrates the inner space of the primary coil 10.

The connector assembly 50 is provided with a connector 51, a connector end portion 52 disposed at an end portion in the direction in which the connector 51 extends, the connector housing 53 integrally fixed to the connector end portion 52 through welding, and the igniter 60 that is fixed to the connector housing 53 and is electrically connected with the connector 51 via the connector end portion 52. The connector assembly 50 is assembled to the case 40 through the intermediary of a connector mounting portion 45 provided in the case 40. The connector mounting portion 45 is provided in the case 40 in such a way as to protrude in the extending direction of the connector 51.

The endface of the connector end portion 52 in the connector assembly 50 is formed in such a way as to extend in a direction perpendicular to the direction in which a surface portion 61 of the igniter 60 facing to an opening window 42 provided in the case 40 extends and in a direction perpendicular to the direction in which the surface of the case 40, in which the opening window 42 is provided, extends.

The igniter 60 is configured in such a way as to energize the primary coil 10 and to cut off the energization, i.e., in such a way as to make a current intermittently flow in the primary coil 10. The igniter 60 is disposed adjacent to an inner wall face portion 41 of the case 40. The case 40 is provided with the opening window 42 that is provided adjacent to the igniter 60 and is formed in the shape of a rectangle. The heat sink 80 is formed in the shape of a rectangle similar to that of the opening window 42; the size of the heat sink 80 is smaller than that of the opening window 42 so that the heat sink 80 is inserted into the opening window 42 through a gap.

Here, a process of bonding the heat sink 80 to the case 40 will be explained. At first, a first adhesive 71 is applied to the surface portion 61, facing the opening window 42, of the igniter 60 and a second adhesive 70 is applied to the inner circumferential surface of the opening window 42. Next, the heat sink 80 is inserted into the opening window 42; then, a surface portion 81, at the igniter side, of the heat sink 80 is made to abut on the surface portion 61 of the igniter 60 through the intermediary of the first adhesive 71.

In the foregoing process, the second adhesive 70 bonds the peripheral portion of the heat sink 80 to the inner circumferential surface of the opening window 42 of the case 40; furthermore, the first adhesive 71 bonds the surface portion 81 of the heat sink 80 to the surface portion 61 of the igniter 60. The second adhesive 70 to be applied to the inner circumferential surface of the opening window 42 and the first adhesive 71 to be applied to the surface portion 61 of the igniter 60 are adhesives made of one and the same material.

The heat sink 80 is bonded to the case 40 in such a manner as described above, so that the opening window 42 of the case 40 is sealed with the heat sink 80.

As well illustrated in FIG. 2, the surface portion 81, to be bonded to the igniter 60, of the heat sink 80 is disposed in such a way as to be on a plane the same as that of the inner wall face portion 41 of the case 40. The surface portion 61 of the igniter 60 is made to abut on the surface portion 81 of the heat sink 80 through the intermediary of the first adhesive 71; the first adhesive 71 bonds the surface portion 61 to the surface portion 81 of the heat sink 80. A surface portion 82 as an exposed portion, at the anti-igniter side, of the heat sink 80 is exposed to the air outside the ignition coil apparatus 1.

After the heat sink 80 is bonded to the case 40 and the igniter 60 in such a manner as described above, a potting resin 90 is filled into the case 40 and is cured therein. The connector assembly 50 including the primary coil 10, the secondary coil 20, the iron core 30, and the igniter 60, which are contained in the case 40, is embedded in the potting resin 90.

The igniter 60 contained in the case 40 is connected with, for example, a vehicle battery, as an external power source, via the connector 51, and energizes the primary coil 10 and cuts off the energization; due to this operation, the igniter 60 gains heat. The heat generated in the igniter 60 is radiated into the air outside the ignition coil apparatus 1, through the intermediary of the heat sink 80 bonded to the igniter 60.

The surface portion 82 as an exposed portion, at the anti-igniter side, of the heat sink 80 is exposed from the opening window 42 of the case 40 to the outside of the ignition coil apparatus 1; unlike the foregoing conventional ignition coil apparatus, the potting resin does not restrict the exposure area of the heat sink. Accordingly, the area of the heat sink 80 to be exposed to the air is determined by the shape of the heat sink 80 itself; thus, the area becomes constant among respective ignition coil apparatuses. This fact is an important characteristic of the ignition coil apparatus according to Embodiment 1.

The internal-combustion-engine ignition coil apparatus according to Embodiment 1, configured in such a manner as described above, is fixed to an internal combustion engine mounted in a vehicle such as an automobile and applies a voltage across the electrodes of an ignition plug mounted in the internal combustion engine so as to produce a spark discharge therebetween. Specifically, a voltage for producing a spark discharge between the electrodes of the ignition plug is generated across the secondary coil 20 by making the igniter 60 energize or de-energize the primary coil 10; this generated voltage is applied across the electrodes of the ignition plug.

As described above, in the internal-combustion-engine ignition coil apparatus according to Embodiment 1, the heat sink 80 is bonded to the igniter 60 contained in the case 40 through the opening window 42 of the case 40, so that it is made possible that the area of the heat sink 80 to be exposed to the air is made constant; thus, there can be obtained stable heat radiation performance that is constant among respective ignition coil apparatuses.

Because as each of the second adhesive 70 to be applied to the inner circumferential surface of the opening window 42 of the case 40 and the first adhesive 71 to be applied to the surface portion 61 of the igniter 60, one and the same adhesive is utilized, the process of bonding the peripheral portion of the heat sink 80 to the inner circumferential surface of the opening window 42 of the case 40 and the process of bonding the surface portion 81 of the heat sink 80 to the surface portion 61 of the igniter 60 can concurrently be performed; therefore, the process can be simplified.

Furthermore, after the heat sink 80 is bonded to the case 40 and the igniter 60 through adhesion, the potting resin 90 is filled into the case 40 and is cured therein, so that the strength of bonding between the heat sink 80 and the igniter 60 can be stabilized.

In addition, it may be allowed that in accordance with the layout inside the case 40 of the ignition coil apparatus 1, the opening window 42 of the case 40, facing the surface portion 61 of the igniter 60, is provided in another portion of the case 40.

In the internal-combustion-engine ignition coil apparatus according to Embodiment 1, because the heat sink is bonded to the opening window provided in the side surface of the case, the igniter can be disposed at an arbitrary position around the side surface of the case and hence the layout easiness in the inside of the ignition coil apparatus is raised; in addition to that, because it is made possible that the area of the heat sink to be exposed to the outside of the case is made constant among respective ignition coil apparatuses and hence the convection inside the engine room containing the internal combustion engine can be utilized, stable heat radiation performance can be obtained.

In the internal-combustion-engine ignition coil apparatus according to Embodiment 1, because the connector mounting portion and the connector end portion can be downsized, the shape of the sealing portion between the connector mounting portion and the connector end portion can be simplified; thus, because the work of fitting the connector mounting portion with the connector end portion is facilitated, the work of assembling the connector assembly to the case is facilitated.

Furthermore, in the internal-combustion-engine ignition coil apparatus according to Embodiment 1, one and the same adhesive is utilized between the case and the heat sink and between the igniter and the heat sink, so that bonding of each of the case and the igniter can be performed in one and the same process; thus, the process can be simplified.

Embodiment 2

Figure 3:
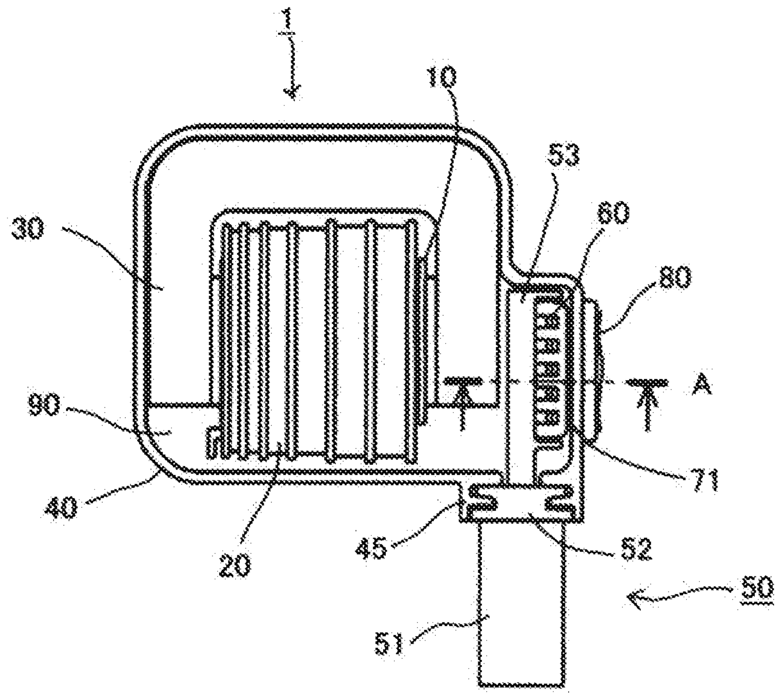
FIG. 3 is a plan view of an internal-combustion-engine ignition coil apparatus according to Embodiment 2.
Figure 4:
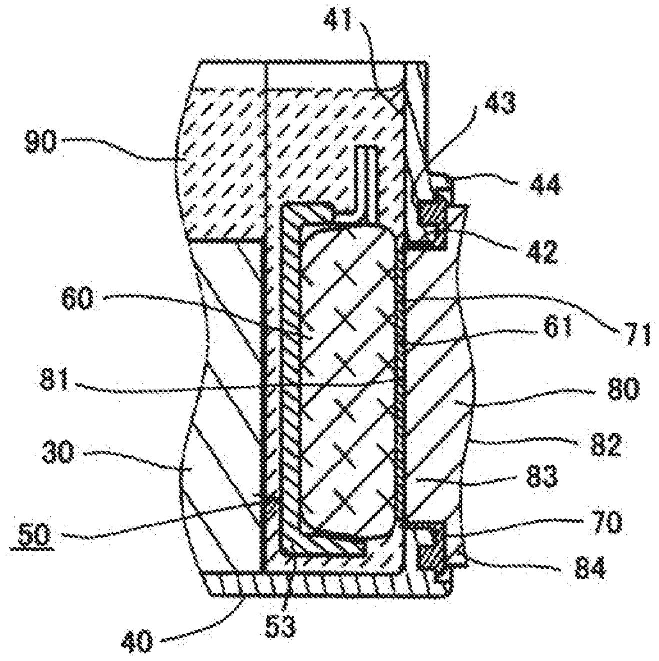
FIG. 4 is a partial cross-sectional view of the internal-combustion-engine ignition coil apparatus according to Embodiment 2.
Figure 5:
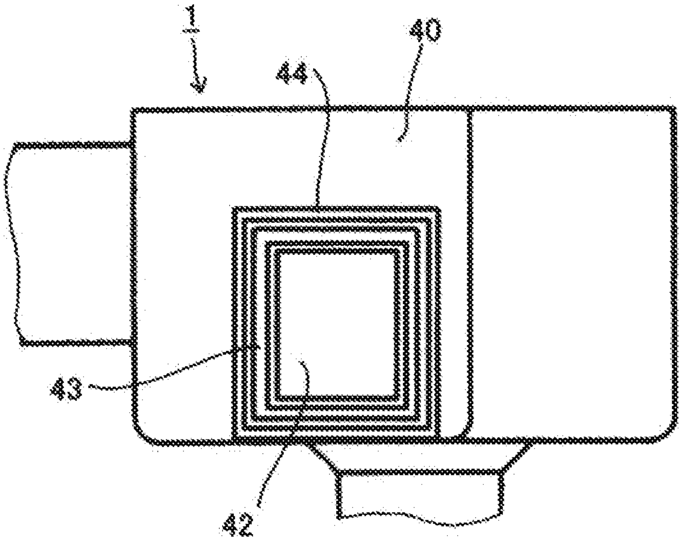
FIG. 5 is a side view of a case in the internal-combustion-engine ignition coil apparatus according to Embodiment 2.

Next, an internal-combustion-engine ignition coil apparatus according to Embodiment 2 will be explained. FIG. 3 is a plan view of an internal-combustion-engine ignition coil apparatus according to Embodiment 2; FIG. 4 is a partial cross-sectional view of the internal-combustion-engine ignition coil apparatus according to Embodiment 2 and illustrates the cross section thereof along the broken line A in FIG. 3, when viewed in the direction indicated by the arrow marks. FIG. 5 is a side view of a case in the internal-combustion-engine ignition coil apparatus according to Embodiment 2 and illustrates the details of an opening window and the periphery thereof at a time before a heat sink is bonded. In FIGS. 3, 4, and 5, the case 40 is provided with an opening window 42, a recessed groove 43 that is continuously formed in such a way as to surround the peripheral portion of the opening window 42, and a protruding wall 44 that is continuously formed in such a way as to surround the peripheral portion of the recessed groove 43. The recessed groove 43 includes four recessed grooves corresponding to the four sides of the opening window 42; each of the recessed grooves is connected with the corresponding adjacent recessed grooves.

As illustrated in FIG. 4, the heat sink 80 is provided with a heat-sink protruding portion 83 to be inserted into the opening window 42 of the case 40 and a heat-sink flange portion 84 that covers the opening portion of the recessed groove 43 of the case 40. As described above, the heat sink 80 has the shape of a rectangle similar to the shape of the opening window 42 of the case 40; the flange portion 84 is formed in the peripheral portion thereof. The four sides of the heat-sink protruding portion 83 in the heat sink 80 is surrounded by the heat-sink flange portion 84; the heat-sink protruding portion 83 is formed in such a way as to have a size smaller than the size of the opening window 42 by a dimension for making the second adhesive 70 lie between the inner circumferential surface of the opening window and itself. When the heat-sink protruding portion 83 is inserted into the opening window 42 of the case 40, the surface portion 81 thereof abuts on the surface portion 61 of the igniter 60 through the intermediary of the first adhesive 71.

The second adhesive 70 to be applied to the inside of the recessed groove 43 of the case 40 is made of a silicone adhesive, which is inexpensive and is superior in the adhesive property. The first adhesive 71 to be applied to the surface portion 61 of the igniter 60 is made of a silicone adhesive, which is superior in the heat radiation performance. The other configurations are the same as those in Embodiment 1.

Here, a process of bonding the heat sink 80 to the case 40 will be explained. At first, the second adhesive 70 is applied to the inside of the recessed groove 43 and the first adhesive 71 is applied to the surface portion 61, facing the opening window 42, of the igniter 60. In this situation, the protruding wall 44 of the case 40 prevents the second adhesive 70 from leaking out to the other surfaces of the case 40. Next, the protruding portion 83 of the heat sink 80 is inserted into the opening window 42 and then is pressed toward the igniter 60; then, the surface portion 81, at the igniter side, of the heat-sink protruding portion 83 of the heat sink 80 is made to abut on the surface portion 61 of the igniter 60 through the intermediary of the first adhesive 71.

Through the foregoing process, the heat-sink flange portion 84 is bonded to the case 40 with the second adhesive 70 filled into the inside of the recessed groove 43 of the case 40. The surface portion 81 of the heat-sink protruding portion 83 is bonded to the surface portion 61 of the igniter 60 with the first adhesive 71. The heat sink 80 is bonded to the case 40 in such a manner as described above, so that the opening window 42 and the recessed groove 43 of the case 40 are sealed with the heat sink 80. The other configurations are the same as those in Embodiment 1.

As described above, in the internal-combustion-engine ignition coil apparatus according to Embodiment 2, the recessed groove 43 is provided in the peripheral portion of the opening window 42 of the case 40, so that the second adhesive 70 can be prevented from leaking out, for example, due to a variation in the application of the second adhesive 70. Moreover, because the heat-sink flange portion 84 can be bonded to the recessed groove 43 of the case 40 in such a way as to be pressed thereagainst, it is not required to manage the amount of pressing the heat-sink protruding portion 83 into the inside of the opening window 42; thus, the process of bonding the heat sink 80 to the case 40 and the igniter 60 can be simplified.

Furthermore, in the internal-combustion-engine ignition coil apparatus according to Embodiment 2, as the second adhesive 70 whose application amount is larger than that of the first adhesive 71, a silicone adhesive, which is inexpensive and is superior in the adhesive property, is utilized; therefore, the bonding of the heat sink 80 to the case 40 can be performed inexpensively and the bonding strength can be raised. Moreover, as the first adhesive 71 whose application amount is smaller than that of the second adhesive 70, a silicone adhesive, which is superior in the heat radiation performance, is utilized; therefore, because the heat in the igniter 60 can efficiently be transferred to the heat sink 80, the heat radiation performance of the igniter 60 can be raised.

Moreover, each of the first adhesive 71 and the second adhesive 70 can be selected in accordance with the material or the like of an adhesion subject; therefore, an adhesive that has an excellent adhesive property for the case 40 and the igniter 60 is utilized, so that the bonding strength can also be raised. Furthermore, when the first adhesive 71 to be applied to the surface portion 61 of the igniter 60 is applied, for example, only to the periphery of a heat-generating device in the igniter 60, it is also made possible that without deteriorating the heat radiation performance, the usage amount of the first adhesive 71, which is superior in the heat radiation performance, can be suppressed.

Moreover, in the internal-combustion-engine ignition coil apparatus according to Embodiment 2, because an adhesive can be selected in accordance with the material or the like of each of the case and the igniter, which are adhesion subjects, it is made possible to readily select an adhesive that can satisfy the adhesive property and the heat radiation performance.

Furthermore, in the internal-combustion-engine ignition coil apparatus according to Embodiment 2, because an adhesive superior in the heat radiation performance is applied to the igniter, stable heat radiation performance can be secured even when the thickness of the adhesive between the heat sink and the igniter changes due to, for example, a variation in assembling the connector assembly to the case.

Moreover, in the internal-combustion-engine ignition coil apparatus according to Embodiment 2, because a recessed groove is provided in the peripheral portion of the opening window of the case, it is made possible to suppress leakage of an adhesive, caused by a variation in the application work of the adhesive, and voids (air bubbles) in the adhesive.

Furthermore, in the internal-combustion-engine ignition coil apparatus according to Embodiment 2, there are provided a heat-sink flange portion to be bonded to the case and a heat-sink protruding portion to be bonded to the igniter; the heat-sink flange portion is pressed against the peripheral portion of the opening window in the case, and the heat-sink protruding portion is inserted into the case through the opening window. As a result, even when the igniter is disposed inside the case, the heat sink can be bonded to the igniter; thus, the assembly process can be simplified.

Embodiment 3

Figure 6:
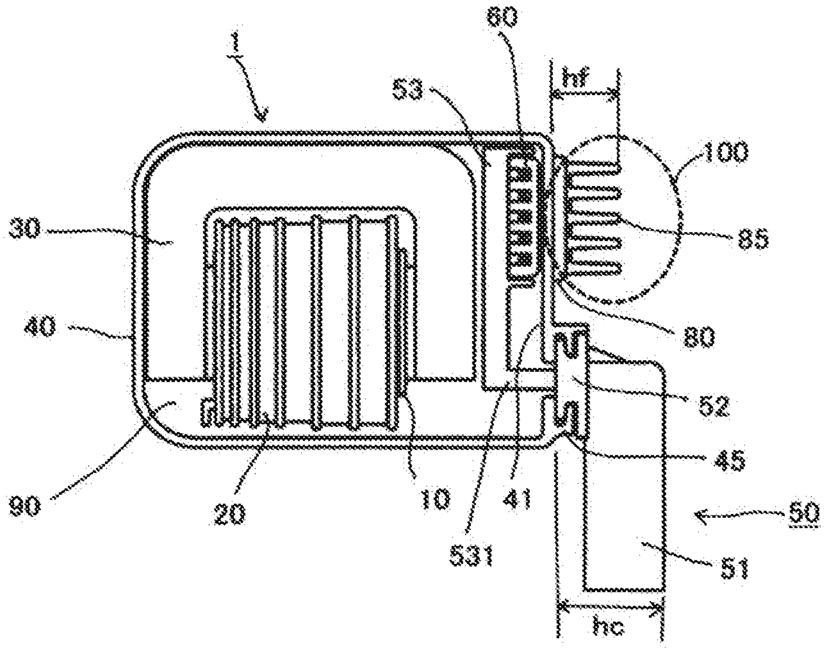
FIG. 6 is a plan view of an internal-combustion-engine ignition coil apparatus according to Embodiment 3.

Next, an internal-combustion-engine ignition coil apparatus according to Embodiment 3 will be explained. FIG. 6 is a plan view of an ignition coil apparatus according to Embodiment 3. In FIG. 6, the connector assembly 50 is provided with the connector 51, the connector end portion 52 disposed at a side surface of the connector 51, the connector housing 53 fixed to the connector end portion 52 through welding, the igniter 60 fixed to the connector housing 53, the heat sink 80, and fins 85 fixed to the surface, at the anti-igniter side, of the heat sink 80.

The connector end portion 52 is provided at a side-surface portion of the end portion of the connector 51 and protrudes in a direction perpendicular to the direction in which the connector 51 extends. The connector housing 53 has a connector coupling portion 531 that is bent toward the connector end portion 52. The connector coupling portion 531 is welded to the connector end portion 52, so that the connector housing 53 is fixed to the connector end portion 52.

As described above, in Embodiments 1 and 2 illustrated in FIGS. 1 and 3, respectively, the endface of the connector end portion 52 in the connector assembly 50 is formed in such a way as to extend in a direction perpendicular to the direction in which the surface portion 61 of the igniter 60 facing to an opening window 42 provided in the case 40 extends and in a direction perpendicular to the direction in which the surface in which the opening window 42 of the case 40 is provided extends; however, in Embodiment 3, as illustrated in FIG. 6, the endface of the connector end portion 52 in the connector assembly 50 is formed in such a way as to extend in a direction the same as the direction in which the surface portion 61 of the igniter 60 facing to the opening window 42 (unillustrated) provided in the case 40 extends and the direction in which the surface of the case 40, in which the opening window 42 is provided, extends.

On the surface portion, at the anti-igniter side, of the heat sink 80, there are provided five fins 85 that stand erect on the surface portion of the heat sink 80 and extend in one and the same direction. The respective extension lengths of the five fins 85 are one and the same. The dimension hf from the surface of the case 40 to the front-end portion of the fin 85 is smaller than the dimension hc from the surface of the case 40 to the side surface, at the anti-connector-end-portion side, of the connector 51. The fins 85 are provided in such a way as to fall within a dead space 100 in the vicinity of the connector 51 in the ignition coil apparatus 1. The other configurations are the same as those in each of Embodiment 1 and Embodiment 2.

In the foregoing internal-combustion-engine ignition coil apparatus according to Embodiment 3, the fins 85 are provided in such a way as to fall within the dead space 100 in the vicinity of the connector 51 in the ignition coil apparatus 1; thus, when the ignition coil apparatus 1 is mounted in an internal combustion engine, the layout easiness can be raised. Moreover, the dimension hf from the surface of the case 40 to the front-end portion of the fin 85 is smaller than the dimension hc from the surface of the case 40 to the side surface, at the anti-connector-end-portion side, of the connector 51; thus, the heat radiation performance can be raised without deteriorating the layout easiness of the ignition coil apparatus 1.

In addition, in Embodiment 3, the five fins 85 whose respective lengths are one and the same are provided; however, it goes without saying that the respective lengths of the fins 85 may not be one and the same, that in consideration of convection inside the engine room of a vehicle such as an automobile, the respective shapes, lengths, extending directions, and the like of the fins 85 may be different from one another, and that the number of the fins 85 may not be limited to five.

In the internal-combustion-engine ignition coil apparatus according to Embodiment 3, the wall face portion of the case, in which the opening window facing the igniter is disposed, is provided in the vicinity of the connector end portion of the connector assembly; therefore, because it is made possible that the space around the connector, which has been a dead space, is effectively utilized and that cooling is performed by use of an air vortex inside an engine room, the layout easiness of the ignition coil apparatus can be raised.

Furthermore, in the internal-combustion-engine ignition coil apparatus according to Embodiment 3, fins are provided in the heat sink, and the dimension from the wall face portion of the case to the front-end portion of the fin is smaller than the dimension from the wall face portion of the case to the side-surface portion, at the anti-case side, of the connector; thus, the heat radiation performance can be raised without deteriorating the layout easiness.

In each of Embodiments 2 and 3, it may be allowed that the foregoing four recessed grooves corresponding to the four sides of the opening window 42 are not connected with the respective adjacent recessed grooves but are separated from one another. Moreover, it may be allowed that there are provided two or more groups of the four recessed grooves, corresponding to the four sides of the opening window 42, that are connected with the respective adjacent recessed grooves.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, numberless unillustrated variant examples are conceivable within the scope of the technology disclosed in the present disclosure. For example, at least one of the constituent components may be modified, added, or eliminated. At least one of the constituent components mentioned in at least one of the preferred embodiments may be selected and combined with the constituent components mentioned in another preferred embodiment.

INDUSTRIAL APPLICABILITY

The present disclosure can be applied to the field of an internal-combustion-engine ignition coil apparatus that supplies an internal-combustion-engine ignition plug with a voltage for producing a spark discharge, to the field of an internal combustion engine, and further to the field of an automobile.

DESCRIPTION OF REFERENCE NUMERALS

10: primary coil
20: secondary coil
30: iron core
40: case
41: inner wall face portion
42: opening window
43: recessed groove
44: protruding wall
45: connector mounting portion
50: connector assembly
51: connector
52: connector end portion
53: connector housing
531: connector coupling portion
60: igniter
70: second adhesive
71: first adhesive
80: heat sink
85: fin
90: potting resin

The invention claimed is:

1. An internal-combustion-engine ignition coil apparatus that supplies an ignition plug mounted in an internal combustion engine with a voltage for producing a spark discharge, the internal-combustion-engine ignition coil apparatus comprising:

a primary coil;

a secondary coil disposed in such a way as to surround an outer circumferential portion of the primary coil;

an iron core that makes the primary coil and the secondary coil magnetically couple with each other;

a case that contains the primary coil, the secondary coil, and the iron core;

a connector assembly in which a connector and an igniter are integrally fixed to each other; and a heat sink that cools the igniter, wherein the connector assembly is assembled to the case, wherein the igniter is contained in the case, wherein the case has an opening window that opens in a wall face portion thereof facing a surface portion of the igniter, wherein the heat sink is inserted into the case through the opening window and is bonded not only to the surface portion of the igniter with a first adhesive but also to the inner circumferential surface of the opening window with a second adhesive, and the heat sink has an exposed portion that is exposed to the outside of the case through the opening window, and wherein a potting resin is filled into the case.

2. The internal-combustion-engine ignition coil apparatus according to claim 1, wherein the first adhesive and the second adhesive are made of respective adhesives different from each other.

3. The internal-combustion-engine ignition coil apparatus according to claim 2, wherein the first adhesive is made of an adhesive having heat radiation performance higher than that of the second adhesive.

4. The internal-combustion-engine ignition coil apparatus according to claim 3, wherein the connector assembly has a connector end portion that protrudes from a side-surface portion of the connector, wherein the case has a connector mounting portion in the wall face portion having the opening window, and wherein the connector end portion is coupled with the connector mounting portion so that the connector assembly is assembled to the case.

5. The internal-combustion-engine ignition coil apparatus according to claim 3, wherein the connector assembly has a connector end portion in the a front-end portion of the connector, wherein the case has a connector mounting portion in a wall face portion thereof perpendicular to the wall face portion having the opening window, and wherein the connector end portion is coupled with the connector mounting portion so that the connector assembly is assembled to the case.

6. The internal-combustion-engine ignition coil apparatus according to claim 2, wherein the connector assembly has a connector end portion that protrudes from a side-surface portion of the connector, wherein the case has a connector mounting portion in the wall face portion having the opening window, and wherein the connector end portion is coupled with the connector mounting portion so that the connector assembly is assembled to the case.

7. The internal-combustion-engine ignition coil apparatus according to claim 2, wherein the connector assembly has a connector end portion in a front-end portion of the connector, wherein the case has a connector mounting portion in a wall face portion thereof perpendicular to the wall face portion having the opening window, and wherein the connector end portion is coupled with the connector mounting portion so that the connector assembly is assembled to the case.

8. The internal-combustion-engine ignition coil apparatus according to claim 1, wherein the first adhesive and the second adhesive are made of one and the same adhesive.

9. The internal-combustion-engine ignition coil apparatus according to claim 8, wherein the connector assembly has a connector end portion that protrudes from a side-surface portion of the connector, wherein the case has a connector mounting portion in the wall face portion having the opening window, and wherein the connector end portion is coupled with the connector mounting portion so that the connector assembly is assembled to the case.

10. The internal-combustion-engine ignition coil apparatus according to claim 8, wherein the connector assembly has a connector end portion in the a front-end portion of the connector, wherein the case has a connector mounting portion in a wall face portion thereof perpendicular to the wall face portion having the opening window, and wherein the connector end portion is coupled with the connector mounting portion so that the connector assembly is assembled to the case.

11. The internal-combustion-engine ignition coil apparatus according claim 1, wherein the case has a recessed groove in a peripheral portion of the opening window.

12. The internal-combustion-engine ignition coil apparatus according to claim 11, wherein the heat sink has a flange portion provided in a peripheral portion thereof and a protruding portion having a surface portion that protrudes in a direction perpendicular to a surface portion of the flange portion, wherein the protruding portion is inserted into the case through the opening window, wherein the surface portion of the protruding portion is bonded to the surface portion of the igniter with the first adhesive, wherein a wall face portion of the protruding portion is bonded to the inner circumferential surface of the opening window with the second adhesive, and wherein the flange portion is bonded to the case with the second adhesive filled into the recessed groove and is exposed to the outside of the case.

13. The internal-combustion-engine ignition coil apparatus according to claim 12, wherein the connector assembly has a connector end portion that protrudes from a side-surface portion of the connector, wherein the case has a connector mounting portion in the wall face portion having the opening window, and wherein the connector end portion is coupled with the connector mounting portion so that the connector assembly is assembled to the case.

14. The internal-combustion-engine ignition coil apparatus according to claim 11, wherein the connector assembly has a connector end portion that protrudes from a side-surface portion of the connector, wherein the case has a connector mounting portion in the wall face portion having the opening window, and wherein the connector end portion is coupled with the connector mounting portion so that the connector assembly is assembled to the case.

15. The internal-combustion-engine ignition coil apparatus according to claim 11, wherein the connector assembly has a connector end portion in the a front-end portion of the connector, wherein the case has a connector mounting portion in a wall face portion thereof perpendicular to the wall face portion having the opening window, and wherein the connector end portion is coupled with the connector mounting portion so that the connector assembly is assembled to the case.

16. The internal-combustion-engine ignition coil apparatus according to claim 1, wherein the connector assembly has a connector end portion that protrudes from a side-surface portion of the connector, wherein the case has a connector mounting portion in the wall face portion having the opening window, and wherein the connector end portion is coupled with the connector mounting portion so that the connector assembly is assembled to the case.

17. The internal-combustion-engine ignition coil apparatus according to claim 16, wherein an endface of the connector end portion, the surface portion of the igniter facing to the opening window, and the surface of the case, in which the opening window is provided, are formed in such a way as to extend in one and the same direction.

18. The internal-combustion-engine ignition coil apparatus according to claim 17, further comprising a fin provided on the exposed portion of the heat sink, wherein the fin is formed in such a way that a first dimension, of the fin from the wall face portion of the case to a front-end portion of the fin, is smaller than a second dimension, from the wall face portion of the case to the side-surface portion, of the connector.

19. The internal-combustion-engine ignition coil apparatus according to claim 16, further comprising a fin provided on the exposed portion of the heat sink, wherein the fin is formed in such a way that a first dimension, of the fin from the wall face portion of the case to a front-end portion of the fin, is smaller than a second dimension, from the wall face portion of the case to the side-surface portion;

at the anti case side, of the connector.

20. The internal-combustion-engine ignition coil apparatus according to claim 1, wherein the connector assembly has a connector end portion in the a front-end portion of the connector, wherein the case has a connector mounting portion in a wall face portion thereof perpendicular to the wall face portion having the opening window, and wherein the connector end portion is coupled with the connector mounting portion so that the connector assembly is assembled to the case.

* * * * *